(12) United States Patent
Choi et al.

(10) Patent No.: US 11,479,223 B1
(45) Date of Patent: Oct. 25, 2022

(54) SYSTEM AND METHOD FOR FORMING BRAKE NEGATIVE PRESSURE

(71) Applicants: HYUNDAI MOTOR COMPANY, Seoul (KR); KIA CORPORATION, Seoul (KR)

(72) Inventors: Yongjun Choi, Suwon-si (KR); Euichul Choi, Seoul (KR); Young Ki Kim, Iksan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/473,986

(22) Filed: Sep. 13, 2021

(30) Foreign Application Priority Data

May 31, 2021 (KR) .......................... 10-2021-0070016

(51) Int. Cl.
| | |
|---|---|
| *G06F 19/00* | (2018.01) |
| *B60T 13/46* | (2006.01) |
| *B60T 17/06* | (2006.01) |
| *B60T 17/02* | (2006.01) |
| *B60T 13/72* | (2006.01) |
| *F01L 1/047* | (2006.01) |
| *F02M 35/10* | (2006.01) |
| *F02B 39/00* | (2006.01) |
| *F02M 31/20* | (2006.01) |

(Continued)

(52) U.S. Cl.
CPC .............. *B60T 13/46* (2013.01); *B60T 13/72* (2013.01); *B60T 17/02* (2013.01); *B60T 17/06* (2013.01); *F01L 1/047* (2013.01); *F02B 39/00* (2013.01); *F02B 63/06* (2013.01); *F02D 29/04* (2013.01); *F02M 31/20* (2013.01); *F02M 35/10229* (2013.01); *F02D 2200/0406* (2013.01); *F02D 2200/501* (2013.01); *F02D 2200/602* (2013.01)

(58) Field of Classification Search
CPC ...... F02C 6/12; F02C 23/005; F02D 41/0007; F02D 2250/41; F04C 23/02; F04C 25/02
See application file for complete search history.

(56) References Cited

U.S. PATENT DOCUMENTS

| | | | |
|---|---|---|---|
| 10,480,431 B1 * | 11/2019 | Dudar ...................... | F02D 41/22 |
| 2016/0153448 A1 * | 6/2016 | Lee .......................... | F02B 37/12 60/605.1 |

(Continued)

*Primary Examiner* — John Kwon
(74) *Attorney, Agent, or Firm* — McDonnell Boehnen Hulbert & Berghoff LLP

(57) ABSTRACT

A system for forming a negative pressure in a negative pressure reservoir of a brake system includes, an engine having an intake manifold and a camshaft, a vacuum pump connected to the camshaft through a clutch device and generating a pump negative pressure, a turbocharger having a compressor supplying a compressed air to the engine, a pump negative pressure line connecting the vacuum pump and the negative pressure reservoir and supplying the pump negative pressure to the negative pressure reservoir, an intake negative pressure line connecting the negative pressure reservoir and the intake manifold and supplying the intake negative pressure of the intake manifold to the negative pressure reservoir, and a negative pressure source selection apparatus configured to control opening and closing of the pump negative pressure line and the intake negative pressure line based on operation of the turbocharger.

20 Claims, 5 Drawing Sheets

(51) Int. Cl.
*F02D 29/04* (2006.01)
*F02B 63/06* (2006.01)

(56) References Cited

U.S. PATENT DOCUMENTS

2018/0156168 A1\* 6/2018 Yaguchi ............. F01M 13/0011
2018/0187582 A1\* 7/2018 Yaguchi ................. B60T 13/52
2019/0360434 A1\* 11/2019 Dudar ................ F02M 25/0854

\* cited by examiner

SYSTEM AND METHOD FOR FORMING BRAKE NEGATIVE PRESSURE

CROSS REFERENCE TO RELATED APPLICATIONS

This application claims priority to and the benefit of Korean Patent Application No. 10-2021-0070016 filed in the Korean Intellectual Property Office on May 31, 2021, the entire contents of which are incorporated herein by reference.

BACKGROUND

(a) Field

The present disclosure relates to a system and method for forming a brake negative pressure. More particularly, the present disclosure relates to a system and method for forming a negative pressure in a brake negative pressure reservoir of a turbocharger vehicle

(b) Description of the Related Art

Generally, a brake system is provided with a negative pressure reservoir in a brake system, to support generation of brake hydraulic pressure by brake pedal operation of a driver. For safe braking of the vehicle, the negative pressure is always maintained in the negative pressure reservoir.

In the case of a naturally aspirated vehicle, the negative pressure may be formed in the brake negative pressure reservoir by using the negative pressure formed in an intake manifold. However, in the case of a turbocharger engine, it is difficult to form a stable negative pressure since a boost pressure is provided in the intake manifold. Therefore, a separate vacuum pump connected to the camshaft is used to form and maintain the negative pressure in the brake negative pressure reservoir.

In this scheme of forming the brake negative pressure, when the vacuum pump is continuously operated according to the driving of the engine, output loss of the engine may occur and fuel efficiency of the vehicle may be deteriorated.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a system and method for forming a brake negative pressure in a brake negative pressure reservoir by selectively using a negative pressure of a vacuum pump and a negative pressure of an intake manifold.

A system for forming a brake negative pressure in a negative pressure reservoir of a brake system of a vehicle includes, an engine having an intake manifold configured to be supplied with intake air and a camshaft configured to control a valve timing, a vacuum pump connected to the camshaft through a clutch device, and configured to generate a pump negative pressure, a turbocharger having a compressor configured to supply a compressed air to the engine, a pump negative pressure line configured to connect the vacuum pump and the negative pressure reservoir and supply the pump negative pressure to the negative pressure reservoir, an intake negative pressure line configured to connect the negative pressure reservoir and the intake manifold and supply the intake negative pressure of the intake manifold to the negative pressure reservoir, and a negative pressure source selection apparatus configured to control opening and closing of the pump negative pressure line and the intake negative pressure line based on operation of the turbocharger.

The negative pressure source selection apparatus may include, a compressed air supply line configured to transfer the compressed air of the turbocharger from the compressor to the engine, a control line configured to connect the compressed air supply line and the clutch device, control valve installed on the control line, a pump negative pressure line valve installed on the pump negative pressure line, and an intake negative pressure line valve installed on the intake negative pressure line.

The system for forming a brake negative pressure may further include an intercooler configured to receive and cool a compressed air from the compressor and supply the cooled air to the intake manifold. The compressed air supply line may connect the compressor and the intercooler. The control line may connect the clutch device from between the compressor and the intercooler, to supply the compressed air of the compressor to the clutch device as a control pressure.

The clutch device may be in a normally released state and engaged when supplied with the control pressure.

The clutch device may include, a housing receiving a rotor shaft of the vacuum pump, and an operation piston connected to and integrally rotate with the rotor shaft and configured to operate in the axial direction of the camshaft to be connected to and released from the camshaft, where the control line is connected to a space between a rotor shaft and the operation piston of the vacuum pump.

The operation piston may be configured to be engaged with the camshaft by contacting when the control pressure is supplied through the control line.

The pump negative pressure line valve may include a pump negative pressure check valve configured to supply the negative pressure from the vacuum pump to the negative pressure reservoir and block the negative pressure in the opposite direction. The intake negative pressure line valve may include an intake negative pressure check valve configured to supply the negative pressure from the intake manifold to the negative pressure reservoir and block the negative pressure in the opposite direction.

The control valve may include a control line check valve configured to supply the compressed air of the turbocharger from the compressed air supply line to the clutch device and block the air flow in the opposite direction.

An exemplary system for forming a brake negative pressure may further include a controller configured to send the control signal to the control valve based on running state information of the vehicle and operation status information of the turbocharger, and the control valve may include a solenoid valve configured to open and close the control line according to a received control signal.

The solenoid valve may be in a normally closed state, and is opened according to the received control signal.

In a low speed running state where the vehicle speed is below a predetermined vehicle speed and the accelerator pedal position is between 0 and a predetermined position, the controller may be configured to close the solenoid valve when the pressure of intake manifold is negative pressure with respect to the negative pressure reservoir, and to open the solenoid valve when the pressure of the intake manifold is a positive pressure with respect to the negative pressure reservoir.

The controller may be configured to close the solenoid valve in a coasting running state where the accelerator pedal position is 0.

The controller may be configured to open the solenoid valve in a medium and high speed running state where the vehicle speed is larger than a predetermined vehicle speed and the accelerator pedal position is larger a predetermined position.

In a medium and high speed running state where the vehicle speed is larger than a predetermined vehicle speed and the accelerator pedal position is between 0 and a predetermined position, the controller may be configured to close the solenoid valve when the negative pressure exists within the negative pressure reservoir, and to open the solenoid valve when the negative pressure does not exist within the negative pressure reservoir.

A method for forming a brake negative pressure in a brake negative pressure reservoir of a vehicle provided with a turbocharged engine includes, monitoring running state information of the vehicle, and selectively supplying, to the negative pressure reservoir, the negative pressure of vacuum pump connected to camshaft of the engine and the negative pressure of intake manifold of the engine, depending on the running state information of the vehicle.

In the selectively supplying, the vacuum pump may be selectively operated to supply the negative pressure of the vacuum pump to the negative pressure reservoir, and an operation of the vacuum pump may be released to supply the negative pressure of the intake manifold to the negative pressure reservoir.

In the selectively supplying, in a low speed running state where the vehicle speed is below a predetermined vehicle speed and the accelerator pedal position is between 0 and a predetermined position, the negative pressure of the intake manifold may be supplied to the negative pressure reservoir when an intake manifold pressure is negative with respect to the negative pressure reservoir, and the negative pressure of the vacuum pump may be supplied to the negative pressure reservoir when the intake manifold pressure is positive with respect to the negative pressure reservoir.

In the selectively supplying, the negative pressure of the intake manifold may be supplied to the negative pressure reservoir in a coasting running state where the accelerator pedal position is 0.

In the selectively supplying, the negative pressure of the vacuum pump may be supplied to the negative pressure reservoir in a medium and high speed running state where the vehicle speed is larger than a predetermined vehicle speed and the accelerator pedal position is larger a predetermined position.

In the selectively supplying, in a medium and high speed running state where the vehicle speed is larger than a predetermined vehicle speed and the accelerator pedal position is between 0 and a predetermined position, the negative pressure of the intake manifold may be supplied to the negative pressure reservoir when the negative pressure exists in the negative pressure reservoir, and the negative pressure of the vacuum pump may be supplied to the negative pressure reservoir when the negative pressure does not exist in the negative pressure reservoir.

According to an exemplary embodiment, the negative pressure of the vacuum pump and the intake manifold is selectively supplied to the brake negative pressure reservoir depending on running state of a vehicle provided with a turbocharger engine. Therefore, it is possible to minimize the output loss used to drive the vacuum pump to maintain the negative pressure of the negative brake pressure reservoir, thereby improving the fuel efficiency of the vehicle.

Since the intake manifold negative pressure as well as the vacuum pump may be used as a source of negative pressure supplied to the negative pressure reservoir, a fail-safe function may be implemented for situations such as vacuum pump failure.

Since the vacuum pump does not operate in the low speed and low output running state, it prevents power loss due to the operation of the vacuum pump, thereby improving the drivability of the vehicle in situations such as low-speed city driving.

Other effects that may be obtained or are predicted by an exemplary embodiment will be explicitly or implicitly described in a detailed description of the present disclosure. That is, various effects that are predicted according to an exemplary embodiment will be described in the following detailed description.

DETAILED DESCRIPTION

Figure 1:
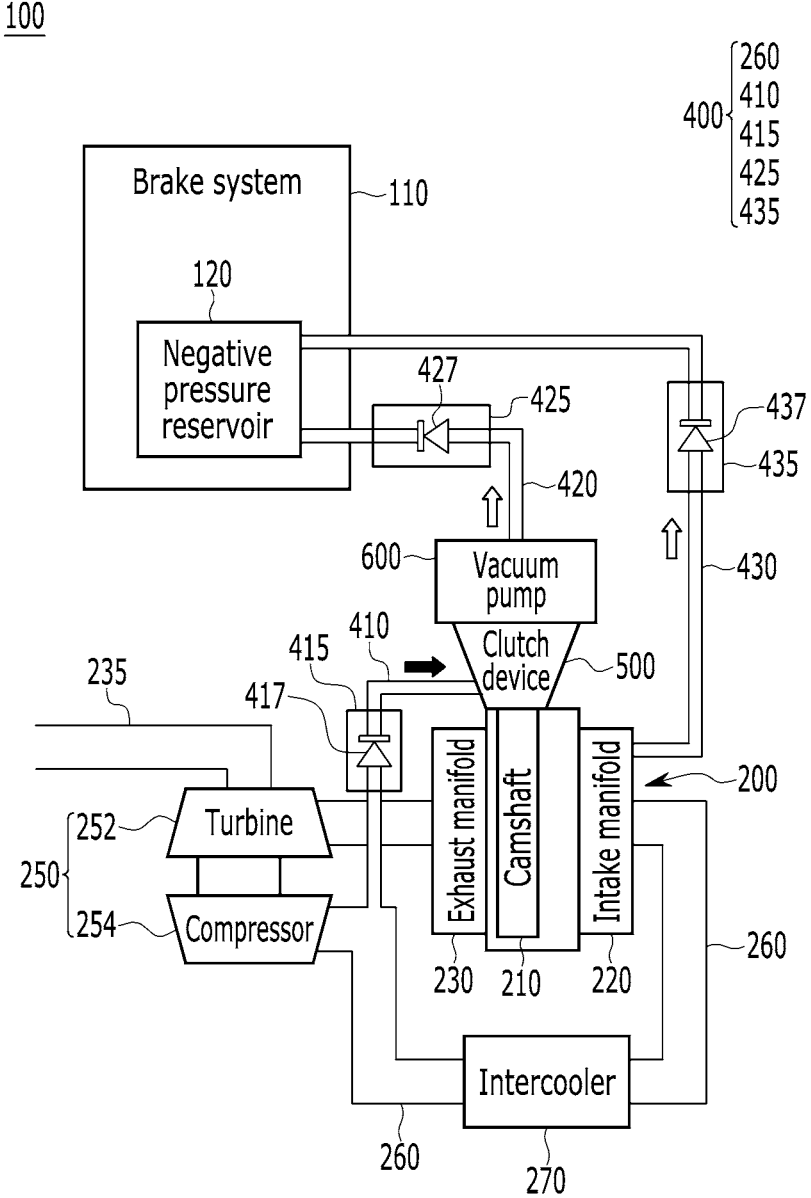
FIG. 1 is a schematic diagram of a system for forming a brake negative pressure according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

In addition, the terms "unit", "part" or "portion", "-er", and "module" in the specification refer to a unit that processes at least one function or operation, which may be implemented by hardware, software, or a combination of hardware and software.

As used herein, the singular forms are intended to include the plural forms as well, unless the context clearly indicates otherwise. As used herein, the term "and/or" includes any one or all combinations of one or more related items.

Hereinafter, a system for forming a brake negative pressure and a method thereof according to an exemplary embodiment is described in detail with reference to the drawings.

FIG. 1 is a schematic diagram of a system 100 for forming a brake negative pressure according to an exemplary embodiment.

As shown in FIG. 1, a system 100 for forming a brake negative pressure according to an exemplary embodiment is a system for forming a brake negative pressure in a negative pressure reservoir 120 of a brake system 110 of a vehicle.

As shown in FIG. 1, a system 100 for forming a brake negative pressure according to an exemplary embodiment includes, an engine 200, a vacuum pump 600, a turbocharger 250, a pump negative pressure line 420, an intake negative pressure line 430, and a negative pressure source selection apparatus 400.

The engine 200 includes, an intake manifold 220 configured to be supplied with an intake air and a camshaft 210 configured to control a valve timing. The engine 200 is an internal combustion engine, and may be, for example, a gasoline engine.

The vacuum pump 600 is connected to the camshaft 210 through a clutch device 500, and configured to generate a pump negative pressure. Therefore, when the engine 200 is operated, the clutch device 500 is operated, and thereby the vacuum pump 600 is operated by the operation of the camshaft 210 to generate the pump negative pressure. A specific configuration and operation of the clutch device 500 is later described in detail.

The turbocharger 250 is provided with a compressor 254 configured to supply a compressed air to the engine 200. For example, the turbocharger 250 may operate the compressor 254 by driving a turbine 252 by an exhaust pressure of an exhaust gas exhausted from an exhaust manifold 230 of the engine 200 through an exhaust pipe 235. Then, the compressor 254 may form air (hereinafter, called a compressed air) having a compressed pressure and supply the compressed air to a combustion chamber (not shown) of the engine 200. However, the present embodiment is not limited thereto. The turbocharger 250 may be implemented in various forms as long as the compressor 254 configured to supply a compressed air to the engine 200 is provided. For example, a supercharger that does not utilize the exhaust gas may correspond to the turbocharger 250 in the present embodiment. Therefore, it should be understood that the term turbocharger in this disclosure is not intended to be limited to form the compressed air only by the exhaust gas, but is used in a broad sense to include any device that provides compressed air to the intake manifold 220 of the engine 200.

The pump negative pressure line 420 is configured to connect the vacuum pump 600 and the negative pressure reservoir 120 and supply the pump negative pressure to the negative pressure reservoir 120.

The intake negative pressure line 430 is configured to connect the negative pressure reservoir 120 and the intake manifold 220 and supply the intake negative pressure of the intake manifold 220 to the negative pressure reservoir 120.

In the present disclosure, the term negative pressure refers to having a negative pressure compared to the surrounding pressure, and does not mean that the absolute pressure is negative. Therefore, the negative pressure reservoir 120 may mean maintaining a pressure lower than the atmospheric pressure, thereby helping the driver to form a high brake hydraulic pressure with less force when the brake pedal is depressed.

The clutch device 500 is actuated by a control pressure to engage or release a clutch.

The negative pressure source selection apparatus 400 is configured to control opening and closing of the pump negative pressure line 420 and the intake negative pressure line 430 based on operation of the turbocharger 250.

For such a purpose, the negative pressure source selection apparatus 400 includes, a compressed air supply line 260 configured to transfer the compressed air of the turbocharger 250 from the compressor 254 to the engine 200, a control line 410 configured to connect the compressed air supply line 260 and the clutch device 500, a control valve 415 installed on the control line 410, a pump negative pressure line valve 425 installed on the pump negative pressure line 420, and an intake negative pressure line valve 435 installed on the intake negative pressure line 430.

In the present disclosure, the lines may be formed in various forms. For example, each line may be formed as a rigid pipe of a metal material, or may be flexible such as a rubber hose.

A system 100 for forming a brake negative pressure according to an exemplary embodiment further includes an intercooler 270 configured to receive and cool the compressed air from the compressor 254 to supply the cooled air to the intake manifold 220. That is, the intercooler 270 configured to cool the air heated by being compressed by the compressor 254.

The compressed air supply line 260 connects the compressor 254 and the intercooler 270. That is, the air compress by the compressor 254 is supplied to the intake manifold 220 via the intercooler 270 through the compressed air supply line 260.

In more detail, the control line 410 is configured to connect the clutch device 500 from between the compressor 254 and the intercooler 270 and supply the compressed air of the compressor 254 to the clutch device 500 as the control pressure.

The pump negative pressure line valve 425 includes a pump negative pressure check valve 427 configured to supply the negative pressure from the vacuum pump 600 to the negative pressure reservoir 120 and block the negative pressure in the opposite direction.

The intake negative pressure line valve 435 includes an intake negative pressure check valve 437 configured to supply the negative pressure from the intake manifold 220 to the negative pressure reservoir 120 and block the negative pressure in the opposite direction.

Supplying of the negative pressure from the vacuum pump 600 to the negative pressure reservoir 120 means that air is drawn from the negative pressure reservoir 120 to the vacuum pump 600. That is, the vacuum pump 600 pumps the air within the negative pressure reservoir 120, to form the negative pressure in the negative pressure reservoir 120. In this process, the pump negative pressure line valve 425 enables that the air flow in the pump negative pressure line 420 is only formed in a direction to increase the negative pressure in the negative pressure reservoir 120 (i.e., the direction to decrease the pressure of the negative pressure reservoir 120).

Similarly, supplying of the negative pressure from the intake manifold 220 to the negative pressure reservoir 120 means that air is drawn from the negative pressure reservoir 120 to the intake manifold 220. That is, when the internal pressure of the intake manifold 220 is below the pressure of the negative pressure reservoir 120, air in the negative pressure reservoir 120 is pumped by the pressure difference to form the negative pressure in the negative pressure reservoir 120. In this process, the intake negative pressure line valve 435 enables that the air flow in the intake negative pressure line 430 is only formed in a direction to increase the negative pressure in the negative pressure reservoir 120 (i.e., the direction to decrease the pressure of the negative pressure reservoir 120).

For example, the control valve 415 may include a control line check valve 417 configured to supply the compressed air of the turbocharger 250 from the compressed air supply line 260 to the clutch device 500 and block the air flow in the opposite direction.

The pump negative pressure check valve 427, the intake negative pressure check valve 437, and the control line check valve 417 may be implemented in the form of a conventional check valve, respectively, to provide the function of a one-way valve.

It may be understood that, for better comprehension, the flow directions of one-way valves in the illustration of the pump negative pressure check valve 427 and the intake negative pressure check valve 437 are shown as the flow direction of the negative pressure, and opposite to flow directions of actual air.

Hereinafter, configuration and operation of the clutch device 500 according to an exemplary embodiment is described in detail with reference to FIG. 2 and FIG. 3.

Figure 2:
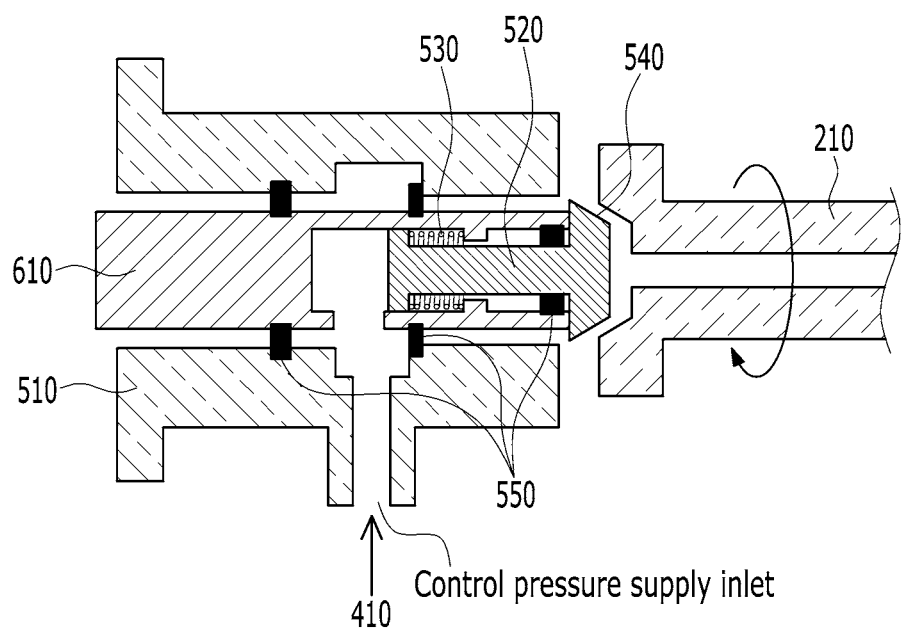
FIG. 2 is a cross-sectional view illustrating a normal state of a clutch device according to an exemplary embodiment.

FIG. 2 is a cross-sectional view illustrating a normal state of the clutch device 500 according to an exemplary embodiment.

Figure 3:
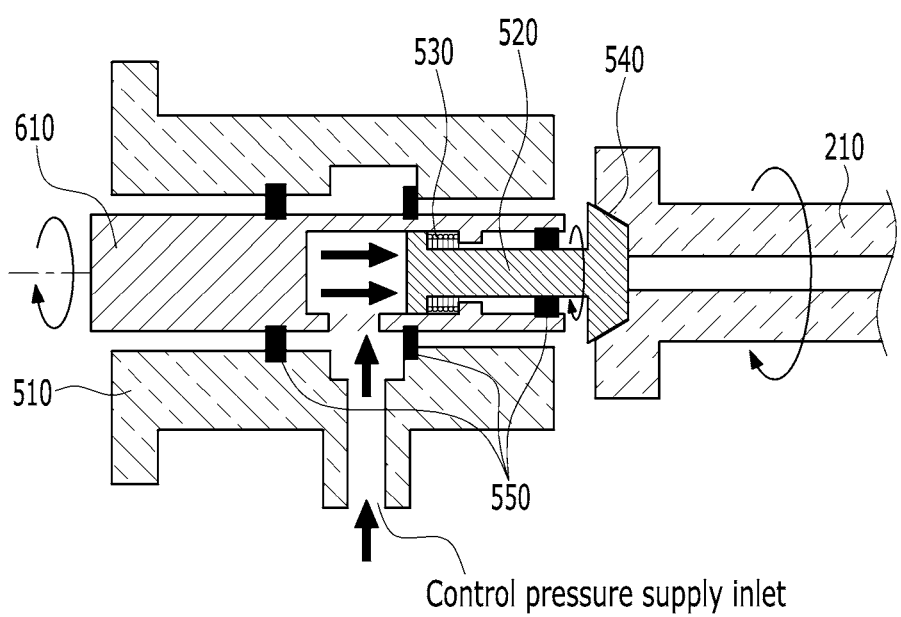
FIG. 3 is a cross-sectional view illustrating an operation of a clutch device according to an exemplary embodiment.

FIG. 3 is a cross-sectional view illustrating an operation of the clutch device 500 according to an exemplary embodiment.

As shown in FIG. 2, the clutch device 500 includes, a housing 510 receiving a rotor shaft 610 of the vacuum pump 600, and an operation piston 520 connected to and integrally rotate with the rotor shaft 610 and configured to operate in the axial direction of the camshaft 210 to be connected to and released from the camshaft 210.

The rotor shaft 610 is a main shaft that drives the vacuum pump 600, and when the rotor shaft 610 rotates, the vacuum pump 600 forms the negative pressure.

The operation piston 520 is connected to and integrally rotate with the rotor shaft 610, however, not integrally formed with the rotor shaft 610. That is, operation piston 520 is coupled with the rotor shaft 610, for example, by spline coupling, such that the operation piston 520 may rotate with the rotor shaft 610 but operable in the axial direction.

A return spring 530 is interposed between the operation piston 520 and the rotor shaft 610, to provide an elastic force to the operation piston 520 toward the rotor shaft 610. That is, the clutch device 500 is in a normally released state.

The control line 410 is connected to a space between the rotor shaft 610 and the operation piston 520 of the vacuum pump 600. Therefore, when the control pressure is supplied through the control line 410, the operation piston 520 is forced in a direction away from the rotor shaft 610 (i.e., the direction toward the camshaft 210).

Therefore, as shown in FIG. 3, by the control pressure supplied through the control line 410, the operation piston 520 moves toward the camshaft 210, and a clutch surface 540 formed on a frontal surface contacts the camshaft 210, thereby forming a clutch engagement state. In this state, the rotation of the camshaft 210 is transferred to the rotor shaft 610, and therefore, the vacuum pump 600 is driven to form the negative pressure.

It may be understandable that the clutch device 500 is in a normally released state and engaged when supplied with the control pressure.

Since the clutch device 500 is in a normally released state, the output of the engine 200 is not consumed to drive the vacuum pump 600 in the basic state.

Therefore, while the negative pressure of the negative pressure reservoir 120 is formed by the negative pressure of the intake manifold 220, the output loss by the vacuum pump 600 may be prevented to improve the fuel efficiency of the vehicle.

Meanwhile, a sealing member 550 is disposed between the rotor shaft 610 and the housing 510 to seal the control pressure supplied through the control line 410.

Referring back to FIG. 1, the operation of a system 100 for forming a brake negative pressure according to an exemplary embodiment is described in detail.

For example, the turbocharger 250 does not operate when the engine load is low, such as engine operation at low engine speed, and coasting of the vehicle with the accelerator pedal off. Therefore, the compressor 254 does not form compressed air, and the intake air is merely supplied to the intake manifold 220 via the compressor 254 and the intercooler 270 through the compressed air supply line 260. In this case, it may be understood that the negative pressure is formed in the intake manifold 220 by the intake resistance.

As such, when the compressor 254 does not operate, a negative pressure is formed on the compressed air supply line 260, so the control pressure is not supplied to the clutch device 500. And in this state, the negative pressure is prevented from being lost from the negative pressure reservoir 120 toward the vacuum pump 600 by the pump negative pressure line valve 425 installed on the pump negative pressure line 420.

Since the control pressure is not supplied to the clutch device 500, the clutch device 500 is in its normally released state, and the vacuum pump 600 is not operated.

That is, in the state where the output of the engine 200 is low because the turbocharger 250 does not operate, by preventing the output loss caused by the operation of the vacuum pump 600, it is possible to prevent the reduction of the output of the engine in the low rotation speed or low output operation state.

Meanwhile, since the negative pressure is formed in the intake manifold 220, this negative pressure is supplied to the negative pressure reservoir 120 through the intake negative pressure line valve 435 installed on the intake negative pressure line 430. Therefore, the negative pressure of the negative pressure reservoir 120 may be formed or maintained.

In the above description, an example in which the control valve 415 is implemented as a check valve has been described, but an exemplary embodiment of the present disclosure is not limited thereto.

In another example, the control valve 415 may include a solenoid valve 418 configured to open and close the control line 410 according to a received control signal.

The solenoid valve 418 is in a normally closed state, and may be opened according to the received control signal. When the solenoid valve 418 is designed to be normally closed, the loss due to control power consumed for the condition that the control pressure is not supplied may be prevented. That is, when the output of the engine 200 is low in which case the turbocharger 250 does not operate, the solenoid valve 418 is closed and the negative pressure of the intake manifold 220 is supplied to the negative pressure reservoir 120, and the energy loss for this control is prevented. Therefore, it is possible to improve the fuel efficiency of the vehicle.

An alternative system 100' for forming a brake negative pressure further includes a controller 750 configured to apply the control signal to the solenoid valve 418 based on running state information of the vehicle and operation state information of the turbocharger 250.

Configuration of the alternative system 100' for forming a brake negative pressure and a method for supplying the negative pressure to the brake negative pressure reservoir 120 are described in detail with reference to FIG. 4 and FIG. 5.

The alternative system 100' for forming a brake negative pressure differs from the above-described system 100 for forming a brake negative pressure in that the control valve 415 is implemented as the solenoid valve 418, the controller 750 configured to control the solenoid valve 418 is further provided, and sensors based on which the controller 750 operates are further provided. For other features of the alternative system 100', refer to the above-described system 100 for forming a brake negative pressure. Therefore, the mechanical features of the alternative system 100' for forming a brake negative pressure are similar to the above-described system 100 for forming a brake negative pressure, and the differences are clear from the block diagram of FIG. 4.

Figure 4:
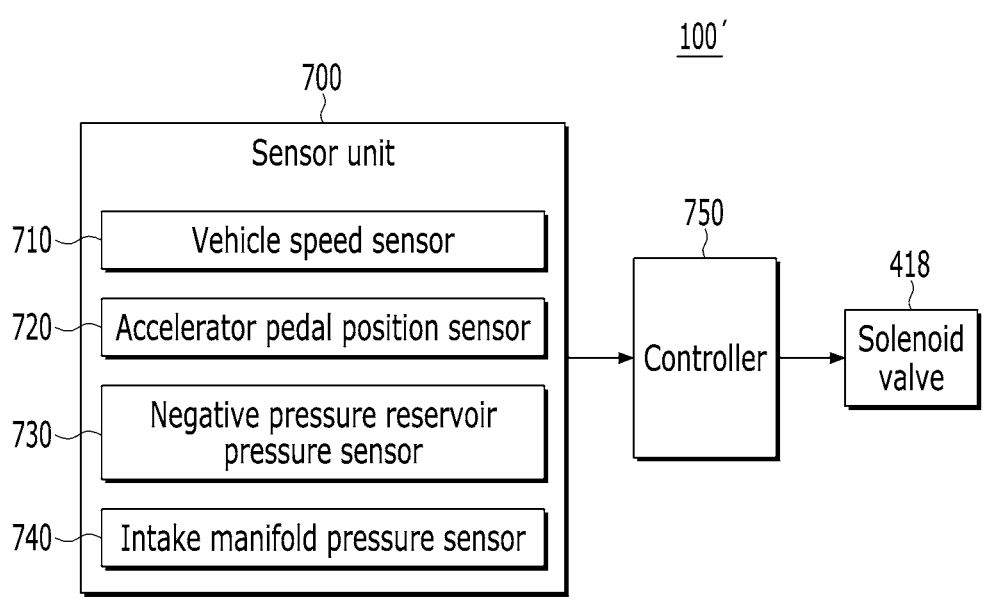
FIG. 4 is a block diagram of a system for forming a brake negative pressure according to another exemplary embodiment.

FIG. 4 is a block diagram of a system 100' for forming a brake negative pressure according to another exemplary embodiment.

As shown in FIG. 4, a system 100' for forming a brake negative pressure includes a sensor unit 700 configured to detect the running state information of the vehicle.

The sensor unit 700 includes, a vehicle speed sensor 710 configured to detect a vehicle speed, the accelerator pedal position sensor 720 configured to detect an accelerator pedal position of the vehicle, a negative pressure reservoir pressure sensor 730 configured to detect the pressure in the negative pressure reservoir 120, and an intake manifold pressure sensor 740 configured to detect the pressure of the intake manifold 220.

Although the sensors of the sensor unit 700 are referred to as sensors, it should not be understood that they necessarily correspond only to conventional sensors, and should be understood to include any configuration for detecting the desired state information.

For example, the vehicle speed sensor 710 may not necessarily be a sensor that measures vehicle speed itself, and may be any device (e.g., an engine control unit) that converts the vehicle speed based on engine speed, shift-stage, etc.

The controller 750 is configured to monitor the running state information of the vehicle through the sensor unit 700, and selectively supply, to the negative pressure reservoir 120, the negative pressure of the vacuum pump 600 connected to the camshaft 210 of the engine 200 and the negative pressure of the intake manifold 220 of the engine 200, depending on the running state information of the vehicle. Such function of the controller 750 may be implemented by controlling the solenoid valve 418.

The controller 750 may be implemented with at least one microprocessor operating by a predetermined program, and the predetermined program may include a series of instructions for performing a method for supplying the negative pressure to the negative pressure reservoir 120 according to an exemplary embodiment.

The controller 750 may be integrated with an engine control unit provided to control the engine 200 of the vehicle, or may be configured separately.

Hereinafter, the operation of the controller 750 controlling the solenoid valve 418 based on vehicle running state information obtained from the sensor unit 700 is described in detail with reference to FIG. 5.

Figure 5:
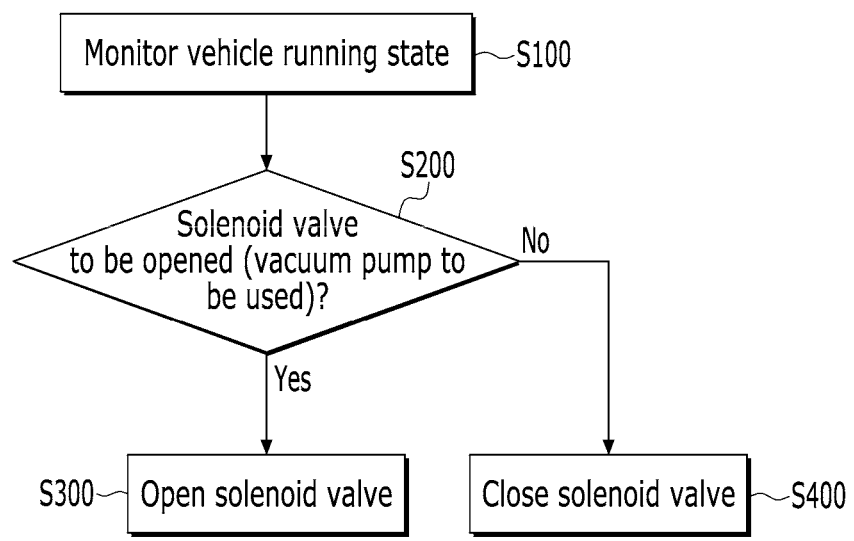
FIG. 5 is a flowchart for showing a method for forming a brake negative pressure according to an exemplary embodiment.

FIG. 5 is a flowchart for showing a method for forming a brake negative pressure according to an exemplary embodiment.

First, at step S100, the controller 750 monitors the running state information of the vehicle.

At this time, the sensor unit 700 may monitor, the vehicle speed through the vehicle speed sensor 710, the accelerator pedal position of the vehicle through the accelerator pedal position sensor 720, the pressure in the negative pressure reservoir 120 through the negative pressure reservoir pressure sensor 730, and the pressure of the intake manifold 220 through the intake manifold pressure sensor 740.

Depending on the running state information of the vehicle, the controller 750 selectively supplies, to the negative pressure reservoir 120, the negative pressure of the vacuum pump 600 connected to the camshaft 210 of the engine 200 and the negative pressure of the intake manifold 220 of the engine 200.

That is, when the controller 750 controls the solenoid valve 418 to be open, the controller 750 supplies, to the negative pressure reservoir 120, the negative pressure of the vacuum pump 600 connected to the camshaft 210 of the engine 200, and when the controller 750 controls the solenoid valve 418 to be closed, the controller 750 supplies, to the negative pressure reservoir 120, the negative pressure of the intake manifold 220 of the engine 200.

For such a purpose, at step S200, the controller 750 determines whether to control the solenoid valve 418 to be open. In other words, the step S200 is to determine whether the negative pressure source supplied to the negative pressure reservoir 120 will be the vacuum pump 600 or the intake manifold 220.

At the step S200, the controller 750 may control the solenoid valve 418 as shown in Table 1 shown below.

TABLE 1

| Running status | System status | Control |
|---|---|---|
| V < V0, 0 < APS < APS0 | In-Mani negative pressure | Close Sol. valve |
| | In-Mani positive pressure | Open Sol. valve |
| V > 0, | | Close Sol. valve |

TABLE 1-continued

| Running status | System status | Control |
|---|---|---|
| APS = 0 | | |
| V > V0, | Negative pressure in reservoir | Close Sol. valve |
| 0 < APS < APS0 | Non-negative pressure in reservoir | Open Sol. valve |
| V > V0, APS > APS0 | | Open Sol. valve |

Referring to the above Table 1, in a low speed running state where a vehicle speed V is below a predetermined vehicle speed V0 and the accelerator pedal position APS is between 0 and a predetermined position APS0, the controller 750 may control the solenoid valve 418 based on the pressure of the intake manifold 220. Specifically, the controller 750 may control the solenoid valve 418 to be closed when the pressure of the intake manifold 220 is negative pressure with respect to the negative pressure reservoir 120, and control the solenoid valve 418 to be open when the pressure of the intake manifold 220 is a positive pressure with respect to the negative pressure reservoir 120. This is because, in the case that the pressure of the intake manifold 220 is a negative pressure, the negative pressure of the intake manifold 220 may be used to supply the negative pressure to the negative pressure reservoir 120, and it is not necessary to operate the vacuum pump 600.

In a coasting running state where the accelerator pedal position APS is 0, regardless of vehicle speed, the controller 750 may control the solenoid valve 418 to be closed. When the accelerator pedal position APS is 0, the output of the engine 200 is not generated and a so-called engine brake phenomenon occurs, so the pressure of the intake manifold 220 becomes negative with respect to the negative pressure reservoir 120. Therefore, in this case, by closing the solenoid valve 418, negative pressure may be supplied to the negative pressure reservoir 120 by using the negative pressure of the intake manifold 220.

In a medium and high speed running state where the vehicle speed V is larger than the predetermined vehicle speed V0 and the accelerator pedal position APS is larger than the predetermined position APS0, the controller 750 may control the solenoid valve 418 to be open. When the vehicle speed is high and the accelerator pedal position APS is large, the pressure of the intake manifold 220 will be positive because it corresponds to the turbocharger operation condition. Therefore, in this case, it may be difficult to form the negative pressure of the negative pressure reservoir 120 by using the pressure of the intake manifold 220. Therefore, in this case, the negative pressure of the vacuum pump 600 may be used to supply the negative pressure to the negative pressure reservoir 120 by controlling the solenoid valve 418 to be open.

In a medium and high speed running state where the vehicle speed V is larger than the predetermined vehicle speed V0 and the accelerator pedal position APS is between 0 and the predetermined position APS0, the controller 750 may control the solenoid valve 418 by referring to whether negative pressure exists in the negative pressure reservoir 120. Specifically, the controller 750 may control the solenoid valve 418 to be closed when negative pressure exists within the negative pressure reservoir 120, and control the solenoid valve 418 to be open when negative pressure does not exist within the negative pressure reservoir 120. Even when the vehicle speed is high, if negative pressure exists in the negative pressure reservoir 120, the loss caused by the operation of the vacuum pump 600 may be minimized by leaving the solenoid valve 418 closed. Meanwhile, if negative pressure becomes absent in the negative pressure reservoir 120, for example, due to using the brake by the user, the solenoid valve 418 may be controlled to be open such that the negative pressure may be supplied to the negative pressure reservoir 120 by using the negative pressure of the vacuum pump 600.

When the controller 750 determines to control the solenoid valve 418 to be open at the step S200, the controller 750 applies, at step S300, the control signal to the solenoid valve 418, to control the solenoid valve 418 to be open.

When the controller 750 determines to control the solenoid valve 418 to be closed at the step S200, the controller 750 does not apply, at step S400, the control signal to the solenoid valve 418, and thereby the solenoid valve 418 remains in its normally closed state.

According to an exemplary embodiment, the negative pressure of the vacuum pump and the intake manifold is selectively supplied to the brake negative pressure reservoir depending on running state of a vehicle provided with a turbocharger engine. Therefore, it is possible to minimize the output loss used to drive the vacuum pump to maintain the negative pressure of the negative brake pressure reservoir, thereby improving the fuel efficiency of the vehicle.

Since the intake manifold negative pressure as well as the vacuum pump may be used as a source of negative pressure supplied to the negative pressure reservoir, a fail-safe function may be implemented for situations such as vacuum pump failure.

Since the vacuum pump does not operate in the low speed and low output running state, it prevents power loss due to the operation of the vacuum pump, thereby improving the drivability of the vehicle in situations such as low-speed city driving.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A system for forming a brake negative pressure in a negative pressure reservoir of a brake system of a vehicle, the system comprising:
   an engine having an intake manifold configured to be supplied with intake air, and a camshaft configured to control a valve timing;
   a vacuum pump connected to the camshaft through a clutch device, the vacuum pump being configured to generate a pump negative pressure;
   a turbocharger having a compressor configured to supply a compressed air to the engine;
   a pump negative pressure line configured to connect the vacuum pump and the negative pressure reservoir and supply the pump negative pressure to the negative pressure reservoir;
   an intake negative pressure line configured to connect the negative pressure reservoir and the intake manifold and supply the intake negative pressure of the intake manifold to the negative pressure reservoir; and
   a negative pressure source selection apparatus configured to control opening and closing of the pump negative pressure line and the intake negative pressure line based on operation of the turbocharger.

2. The system of claim 1, wherein the negative pressure source selection apparatus comprises:

a compressed air supply line configured to transfer the compressed air of the turbocharger from the compressor to the engine;

a control line configured to connect the compressed air supply line and the clutch device;

a control valve installed on the control line;

a pump negative pressure line valve installed on the pump negative pressure line; and an intake negative pressure line valve installed on the intake negative pressure line.

3. The system of claim 2, further comprising an intercooler configured to receive and cool a compressed air from the compressor and supply the cooled air to the intake manifold;

wherein the compressed air supply line connects the compressor and the intercooler; and wherein the control line connects the clutch device from between the compressor and the intercooler to supply the compressed air of the compressor to the clutch device as a control pressure.

4. The system of claim 3, wherein the clutch device is in a released state, and is engaged when supplied with the control pressure.

5. The system of claim 4, wherein the clutch device comprises:

a housing receiving a rotor shaft of the vacuum pump; and an operation piston connected to and configured to integrally rotate with the rotor shaft, and the operation piston being configured to operate in the axial direction of the camshaft to be connected to and released from the camshaft;

wherein the control line is connected to a space between a rotor shaft and the operation piston of the vacuum pump.

6. The system of claim 5, wherein the operation piston is configured to be engaged with the camshaft when the control pressure is supplied through the control line.

7. The system of claim 3, wherein:

the pump negative pressure line valve comprises a pump negative pressure check valve configured to supply the negative pressure from the vacuum pump to the negative pressure reservoir, and to block the negative pressure in an opposite direction; and the intake negative pressure line valve comprises an intake negative pressure check valve configured to supply the negative pressure from the intake manifold to the negative pressure reservoir, and to block the negative pressure in the opposite direction.

8. The system of claim 7, wherein the control valve comprises a control line check valve configured to supply the compressed air of the turbocharger from the compressed air supply line to the clutch device, and to block the air flow in the opposite direction.

9. The system of claim 7, further comprising a controller configured to send the control signal to the control valve based on running state information of the vehicle and operation status information of the turbocharger, wherein the control valve comprises a solenoid valve configured to open and close the control line according to a received control signal.

10. The system of claim 9, wherein the solenoid valve is in a closed state, and is opened according to the received control signal.

11. The system of claim 9, wherein, in a low speed running state where the vehicle speed is below a predetermined vehicle speed and the accelerator pedal position is between 0 and a predetermined position, the controller is configured to close the solenoid valve when the pressure of intake manifold is a negative pressure with respect to the negative pressure reservoir, and to open the solenoid valve when the pressure of the intake manifold is a positive pressure with respect to the negative pressure reservoir.

12. The system of claim 9, wherein the controller is configured to close the solenoid valve in a coasting running state where the accelerator pedal position is 0.

13. The system of claim 9, wherein the controller is configured to open the solenoid valve to be open in a medium and high speed running state where the vehicle speed is larger than a predetermined vehicle speed and the accelerator pedal position is larger a predetermined position.

14. The system of claim 9, wherein, in a medium and high speed running state where the vehicle speed is larger than a predetermined vehicle speed and the accelerator pedal position is between 0 and a predetermined position, the controller is configured to close the solenoid valve when the negative pressure exists within the negative pressure reservoir, and to open the solenoid valve when the negative pressure does not exist within the negative pressure reservoir.

15. A method for forming a brake negative pressure in a brake negative pressure reservoir of a vehicle provided with a turbocharged engine, the method comprising:

monitoring running state information of the vehicle; and selectively supplying, to the brake negative pressure reservoir, a negative pressure of a vacuum pump connected to camshaft of the engine and a negative pressure of intake manifold of the engine, depending on the running state information of the vehicle.

16. The method of claim 15, wherein, in the selectively supplying:

the vacuum pump is selectively operated to supply the negative pressure of the vacuum pump to the negative pressure reservoir; and an operation of the vacuum pump is released to supply the negative pressure of the intake manifold to the negative pressure reservoir.

17. The method of claim 16, wherein, in the selectively supplying, in a low speed running state where the vehicle speed is below a predetermined vehicle speed and the accelerator pedal position is between 0 and a predetermined position, the negative pressure of the intake manifold is supplied to the negative pressure reservoir when an intake manifold pressure is negative with respect to the negative pressure reservoir; and the negative pressure of the vacuum pump is supplied to the negative pressure reservoir when the intake manifold pressure is positive with respect to the negative pressure reservoir.

18. The method of claim 16, wherein, in the selectively supplying, the negative pressure of the intake manifold is supplied to the negative pressure reservoir in a coasting running state where the accelerator pedal position is 0.

19. The method of claim 16, wherein, in the selectively supplying, the negative pressure of the vacuum pump is supplied to the negative pressure reservoir in a medium and high speed running state where the vehicle speed is larger than a predetermined vehicle speed and the accelerator pedal position is larger a predetermined position.

20. The method of claim 16, wherein, in the selectively supplying, in a medium and high speed running state where the vehicle speed is larger than a predetermined vehicle speed and the accelerator pedal position is between 0 and a predetermined position, the negative pressure of the intake manifold is supplied to the negative pressure reservoir when the negative pressure exists in the negative pressure reservoir; and the negative pressure of the vacuum pump is supplied to the negative pressure reservoir when the negative pressure does not exist in the negative pressure reservoir.

* * * * *